United States Patent [19]
Ross et al.

[11] Patent Number: 6,156,404
[45] Date of Patent: *Dec. 5, 2000

[54] METHOD OF MAKING HIGH PERFORMANCE, LOW NOISE ISOTROPIC MAGNETIC MEDIA INCLUDING A CHROMIUM UNDERLAYER

[75] Inventors: Caroline A. Ross, Mountain View; Tu Chen, Monte Sereno, both of Calif.

[73] Assignee: Komag, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/733,860

[22] Filed: Oct. 18, 1996

[51] Int. Cl.⁷ .................................................. G11B 5/66
[52] U.S. Cl. .................... 428/65.3; 428/65.7; 428/141; 428/336; 428/694 TS; 428/900; 427/128; 427/219; 427/130; 204/192.2
[58] Field of Search ............................. 428/694 TS, 141, 428/336, 900, 65.3, 65.7; 427/128, 129, 130; 204/192.2

[56] References Cited

U.S. PATENT DOCUMENTS

| | | | |
|---|---|---|---|
| 3,957,454 | 5/1976 | Bessen | 428/564 |
| 4,346,137 | 8/1982 | Hecht | 428/215 |
| 4,529,667 | 7/1985 | Shiga et al. | 428/646 |
| 4,552,820 | 11/1985 | Lin et al. | 428/611 |
| 4,632,883 | 12/1986 | Howard et al. | 428/611 |
| 4,652,499 | 3/1987 | Howard | 428/641 |
| 4,743,491 | 5/1988 | Asada et al. | 428/213 |
| 4,786,564 | 11/1988 | Chen et al. | 428/694 TS |
| 4,950,548 | 8/1990 | Furusawa et al. | 428/611 |
| 5,082,747 | 1/1992 | Hedgcoth | 428/611 |
| 5,084,109 | 1/1992 | Sikka | 148/621 |
| 5,153,044 | 10/1992 | Chen et al. | 428/65.5 |
| 5,180,640 | 1/1993 | Yamashita et al. | 428/611 |
| 5,198,309 | 3/1993 | Nakamura et al. | 428/667 |
| 5,242,761 | 9/1993 | Uchiyama | 428/694 MM |
| 5,316,844 | 5/1994 | Suzuki et al. | 428/323 |
| 5,326,637 | 7/1994 | Nasu et al. | 428/336 |
| 5,344,706 | 9/1994 | Lambeth et al. | 428/336 |
| 5,441,788 | 8/1995 | Bloomquist et al. | 428/65.6 |
| 5,486,242 | 1/1996 | Naka et al. | 148/422 |
| 5,569,533 | 10/1996 | Lal et al. | 428/332 |
| 5,605,733 | 2/1997 | Ishikawa et al. | 428/65.3 |
| 5,658,659 | 8/1997 | Chen et al. | 428/332 |
| 5,693,426 | 12/1997 | Lee et al. | 428/611 |

FOREIGN PATENT DOCUMENTS

| | | |
|---|---|---|
| 0 399 747 A2 | 11/1990 | European Pat. Off. . |
| 0 704 839 A1 | 4/1996 | European Pat. Off. . |
| 62-256215 | 8/1995 | Japan . |

OTHER PUBLICATIONS

Deng, Y., et al., "Magnetic Properties and Crystal Texture of Co Alloy Thin Films Prepared on Double Bias Cr", *J. Appl. Phys. 73* (*10*), May 1993, pp. 6677–6679.

Mirzamaani, M., et al., "Orientation Ratio of Sputtered Thin–Film Disks", *J. Appl. Phys. 67* (*9*), May 1990, pp. 4695–4697.

Kogure, T., et al., "High–Coercivity Magnetic Hard Disks Using Glass Substrates", *J. Appl. Phys. 67* (*9*), May 1990, pp. 4701–4703.

Teng, E., et al., "Anistotropy Induced Signal Waveform Modulation of DC Magnetron Sputtered Thin Film Disks", *Transactions on Magnetics*, vol. 32, No. 6, Nov. 1995, pp. 2731–2733.

Zhu, et al., Micromagnetic Studies of Thin Metallic Films, *J. Appl. Phys. 63* (*8*), Apr. 1988, pp. 3248–3253.

(List continued on next page.)

*Primary Examiner*—Leszek Kiliman

[57] ABSTRACT

A method of manufacturing a magnetic disk includes the steps of depositing a sublayer, a Cr layer and a Co based magnetic layer on a substrate. The sublayer causes the Cr crystals to avoid growing with a predominantly (200) orientation. Because of this the magnetic layer will be isotropic in the film plane and independent of any texture or scratch marks in the substrate.

49 Claims, 12 Drawing Sheets

OTHER PUBLICATIONS

Mahvan, N. et al., Oxidation of Seed–Layer for Improved Magnetic & Recording Performance of Thin–Film Rigid Discs, Nov. 1993, IEEE Transactions On Magnetics, vol. 29, No. 6, pp. 3691–3693.

Williams, M.L., et al., "An Analytical Model of the Write Process in Digital Magnetic Recording", Reprinted from 17th Annu. *AIP Conf. Proc.*, Part 1, No. 5, 1971, pp. 738–742.

Chang, et al., "Effects of Al Micro Bumps on the Magnetic Properties and Morphology of CoCrTa/CrAl Thin Films"; *Transactions on Magnetics*, vol. 31, No. 6, Nov. 1995, pp. 2731–2735.

Tsai, et al., "The Effects of $Ni_3P$–Sublayer On The Properties of CoNiCr/Cr Media Using Different Substrates", *IEEE*, 1992, p. JA–08.

Moon, J. et al., "Nonlinearities in Thin–Film Media and Their Impact on Data Recovery", *Transactions on Magnetics*, vol. 29, No. 1, Jan. 1993, pp. 177–182.

Chen, T., et al., "Physical Origin of Limits in the Performance of Thin–Film Longitudianl Recording Media", Reprinted from *IEEE Transactions on Magnetics*, vol. 24, No. 6, 1988, pp. 2700–2705.

Anelva, Product Note for C–3010 "Disk Sputtering System", Aug. 1995.

Tang, E., et al., "Anisotropy Induced Signal Waveform Modulation of DC Magnetron Sputtered Thin Film Discs," Sep. 1986, IEEE Transactions on Magnetics, Mag–22, No. 5, pp. 579–581.

Lee, et al., "NiAl Underlayers For CoCrTa Magnetic Thin Films", *IEEE Transactions on Magnetics*, vol. 30, No. 6, Nov. 1994, pp. 3951–3953.

Nolan, et al., "Effect of Microstructural Features on Media Noise in Longitudinal Recording Media", *J. Appl. Phys. 73 (10)*, May 1993.

Lal, et al., "Ultra–Thin Cr–Seedlayer for High Performance Longitudinal Thin–Film Media on Glass–Ceramic Substrates", *IEEE*, Jul. 1996, p. FA–03.

Lee, et al., "Effects of Cr Intermediate Layers on CoCrPt Thin Film Media on NiAl Underlayers", *IEEE Transactions on Magnetics vol. 31*, No. 6, Nov. 1995, pp. 2728–2730.

Lee, et al., "Seed Layer Induced (002) Crystallographic Texture in NiAl Underlayers", *J. App. Phys. 79 (8)* Apr. 15, 1996, pp. 4902–4904.

R. Ranjan, *Digests of The Magnetic Recording Conference*, "Effect of Various Magnetic Structures on Extendibility of the Longitudinal Thin Film Media Performance to High Recording Density", IEEE Magnetics Society Aug. 19–21, 1996.

FIG. 10B"

METHOD OF MAKING HIGH PERFORMANCE, LOW NOISE ISOTROPIC MAGNETIC MEDIA INCLUDING A CHROMIUM UNDERLAYER

BACKGROUND

The present invention relates principally to the manufacture of magnetic recording media used in rigid disk drives commonly used for computer data storage. In particular, the present invention relates to a novel method for manufacturing low noise, high coercivity ("Hc") isotropic media using a heated substrate and multiple nucleation layers, including a Cr-alloy underlayer.

Future magnetic disks will be required to store increasingly high density data. The recording performance of advanced magnetic disks is commonly determined by four basic characteristics, known as PW50, overwrite, non-linear-transition-shift ("NLTS") and media noise. These characteristics are described in detail in Bertram, "Theory of Magnetic Recording", Cambridge University Press, published in 1994, incorporated herein by reference.

PW50 is the half width of the output signal (i.e. the width of that portion of a pulse from the time its rising edge reaches one half of its amplitude to the time its falling edge falls to one half its amplitude). PW50 must be minimized to achieve high recording density. Means of reducing PW50 include reducing "Mrt" (the magnetic film thickness t times remanence Mr), raising Hc, increasing hysteresis loop squareness "S*", and increasing remanent coercivity squareness, "S*rem", as described by Williams and Comstock in "An Analytical Model of the Write Process in Digital Magnetic Recording," A.I.P. Conf. Proc. Mag. Materials, 5, p. 738 (1971).

Overwrite ("OW") is a measure of what remains of a first signal after a second signal (for example of a different frequency) has been written over it on the media. OW is improved by raising S* and by decreasing Hc and Mrt.

Non-linear transition shift (NLTS) refers to an unpredictable shift in the location of the written bits, which can cause an error. NLTS can be reduced by reducing Mrt and increasing Hc.

High density media also need to have low noise. The noise performance includes read jitter and write jitter. Read jitter is primarily determined by the amount of signal available from a bit, and the noise in the channel and head, and is reduced by increasing Mrt. Write jitter is determined by the intrinsic noise of the magnetic layer and can be reduced by breaking the exchange interaction between the magnetic particles and by reducing domain percolation at the transitions between magnetic domains. This may be accomplished by spacing the grains apart from one another by a few angstroms or more, or by interposing a non-magnetic material or insulator at the grain boundaries, as described by Chen et al. in "Physical Origin of Limits in the Performance of Thin-Film Longitudinal Recording Media," IEEE Trans. Mag., vol. 24, no, 6, p. 2700 (1988). Intrinsic media noise has been theoretically modeled by Zhu et al. in "Micromagnetic Studies of Thin Metallic Films", J. Appl. Phys., vol. 63, no. 8, p. 3248 (1988). A reduction in interparticle exchange interaction has also been tied to an increase in Hc by Chen et al. and by Zhu et al. in the aforementioned references.

There is yet another source of media noise namely, the grain noise. For media with well isolated grains, smaller grains provide sharper transitions and therefore exhibit lower media noise, both in the down track as well as the cross-track directions. The grain noise is very important for future high recording density which will have bit sizes approaching the dimensions of a few magnetic grains.

Most media made today are "oriented", i.e. Hc, Mrt and S* are higher in the circumferential direction than in the radial direction, as opposed to "isotropic" media which have the same Hc, Mrt and S* in all in-plane directions. It is believed that the performance of oriented media is poorer than that of isotropic media at high bit density especially in terms of off-track noise and transition percolation. Transition percolation is worse for oriented media where the magnetic easy axis lies preferentially in the circumferential direction. For this reason, high density media are likely to be isotropic.

Hence future high density media require high Hc and Mrt, high S*, small, well isolated grains and isotropic magnetic properties. At present, media are commonly made by using two methods.

DESCRIPTION OF PRIOR ART MANUFACTURING PROCESSES

A. Low Temperature Media

In a first method in accordance with the prior art, "low temperature media" are manufactured by plating a NiP layer onto an Al alloy substrate, polishing the NiP layer and then texturing the NiP layer. Texturing is achieved by applying scratches to the NiP in a circumferential direction to reduce stiction between the recording head and the disk. Thereafter a nucleation layer, CoPt-based alloy magnetic layer and carbon protective layer are sputtered sequentially onto the substrate. This process is described by Yamashita et al. in U.S. Pat. No. 5,180,640. Such media are sputtered without substrate heating or with moderate heating, using a low rate sputter process (typically less than about 1 nm/second), using an in-line sputter system. The nucleation layer is typically sputtered NiP, which controls the grain size of the magnetic layer. Segregation of non-magnetic elements isolates the Co alloy grains to give high Hc and low noise. The Co alloy grains have random c-axis orientation.

Such media have several advantages. The media have isotropic magnetic properties irrespective of the substrate texture. Little or no substrate heating is required which simplifies manufacturing and improves uniformity. The media have fine, uniform grain size which is controlled by the nucleation layer, and consequently have uniform magnetic properties and high S*. Additionally, the process can tolerate a relatively low sputter base pressure such as $10^{-6}$ Torr, which allows the use of in-line sputter systems. Segregation isolates the particles and gives low noise. See, for example, U.S. patent application Ser. No. 08/286,653, incorporated herein by reference.

However, the disadvantage of this process is that segregation of the non magnetic elements, which is needed to isolate the magnetic grains, is slow at low temperatures. Hence the process requires a low sputter rate to allow time for segregation to occur, and the magnetic layer has to contain elements or compounds which segregate easily, such as silica or CoO. This limits the choice of segregants and prevents the use of metallic segregants such as Cr or Ta, which segregate only at elevated temperatures.

B. High Temperature "Oriented" Media

In a second method, "oriented media" are manufactured by plating a NiP layer onto an Al substrate, polishing the NiP layer and then circumferentially texturing the NiP layer. Thereafter the substrate is heated (typically over 200° C.), and a Cr underlayer, CoCr alloy magnetic layer and carbon protective layer are sputtered sequentially onto the substrate. This process is described by Hedgecoth in U.S. Pat. No.

5,082,747. Sputtering the Cr at an elevated temperature, typically over 200° C., causes the Cr to form with a (200) crystal orientation, which in turn causes the Co magnetic alloy layer to form with a (11$\bar{2}$0) crystal orientation. Under these conditions the magnetic properties of the film are sensitive to substrate texture, i.e. the Hc, Mrt etc. are higher parallel to the texture lines than perpendicular to the texture lines (as described in Ballard and Teng, "Anisotropy Induced Signal Waveform Modulaton of DC Magnetron Sputtered Thin Film Disks," IEEE Trans. Mag., Vol. Mag-22, No. 5, September 1986, p. 579 and in Mirzamaani et al., "Orientation Ratio of Sputtered Thin-Film Disks", J. Appl. Phys. 67, p. 4695 (1990)). The Cr underlayer grain size controls the Co alloy grain size. Segregation of Cr and other alloying elements such as Ta in the Co alloy layer grain boundaries isolate the magnetic grains.

Such media have several advantages. The use of elevated temperature for sputtering promotes segregation of alloying elements such as Cr and Ta within the Co magnetic alloy, giving good isolation, high Hc and low noise. High rate sputter processes may be used, e.g. greater than 5 nm/second, allowing the use of static sputter systems such as Intevac 250A. Hc, Mrt and S* are high parallel to the circumferential texture lines.

However, there are also numerous disadvantages. Hc increases with Cr thickness, and typically Cr thicknesses of over 60 nm are required to obtain sufficiently high Hc, as described in the product note of the C-3010 sputter system from Anelva Corp. (Tokyo, Japan). Since the grain size of the Cr film increases with thickness, this causes a larger Co alloy grain size and consequently high grain noise. Additionally, there may be multiple nucleation of Co alloy grains on the Cr grains, as described by Nolan et al., "Effect of Microstructural Features on Media Noise in Longitudinal Recording Media," J. Appl. Phys. 73, p. 5566 (1993) and the consequent clusters of Co grains show poor uniformity. One approach to reduce grain size is to use a ultra-clean vacuum system as described by Takahashi in "High Coercive Force and Low Intergranular Coupling in CoCrTa Thin Film Recording Media Fabricated Under Ultra Clean Sputtering Process", submitted for publication to Journal of Magnetism and Magnetic Materials. This approach boosts Ha and therefore enables one to use a thinner Cr underlayer. This causes high Ha with smaller grains. However, such a process is very difficult to implement for low cost manufacturing using an in-line machine as described in the Yamashita patent, since the panels continuously bring water and oxygen when they are exposed to the outside environment during loading and unloading of disks.

An additional disadvantage of such media is that the magnetic properties of the media are very sensitive to the presence of residual scratches and texture non-uniformities in the substrate. The media relies on scratches to give high Hc and S* along the track, but the resulting media has worse percolation and noise due to its anisotropic magnetic properties. For high density media with low flying height, the substrate roughness needs to be minimized. It is difficult to eliminate residual scratches left by the polishing process. The presence of residual scratches and texture non-uniformity cause magnetic inhomogeneities in the media and create signal modulation, which is undesirable, and even a very small number of residual scratches causes bitshift. Media with isotropic magnetic properties can only be made with a high temperature Cr underlayer process if a perfectly smooth, or 'superpolished' substrate may be used, without any residual scratches. However, it is difficult and expensive to manufacture a substrate without residual scratches because this requires at least two polishing steps. Also, the mechanical performance of smooth media is poor because the stiction between the head and the disk is high.

Hence (a) it would be an advantage to make media with high Hc, S* and low Mrt but with small grain size, to obtain lower noise, and (b) it would be advantageous to decouple the effect of substrate texture from film magnetic properties, so that isotropic media can be made with no dependence of the magnetic properties on residual scratches or texture.

SUMMARY

We have discovered that the magnetic film characteristics can be decoupled from the substrate texture, and that the grain size can be reduced, by forming a sublayer between the substrate and the Cr underlayer. The media is constructed as follows:

1. A substrate is made from a NiP-plated alloy, glass, glass ceramic, sintered carbon, or other appropriate material with suitable texture to reduce stiction.

2. A sublayer is deposited onto the substrate. The sublayer is typically nonmagnetic, crystalline and is formed by sputtering. The sublayer may be deposited at ambient or elevated temperature. Ambient temperature may be preferable for better uniformity, though some heating may be used to optimize grain size.

3. A Cr underlayer is deposited over the sublayer. Cr grows epitaxially on the sublayer grains, so the Cr grain size may be reduced by controlling the grain size in the sublayer. Additionally, the sublayer modifies the growth of the Cr underlayer so that a (200) crystal orientation does not predominate, even if the Cr is deposited at an elevated temperature. The Cr underlayer may be replaced by a b.c.c. alloy of Cr, e.g. CrV, CrMo, CrTa or non-magnetic CrCo. The lattice parameter of the Cr alloy is chosen to match that of the Co alloy to optimize the crystal quality of the Co film and hence the magnetocrystalline anisotropy Ku. The Cr may be deposited at ambient or elevated temperature. Ambient temperature may be preferable for better uniformity.

4. A magnetic layer is then formed on the Cr underlayer at elevated temperature. The resulting magnetic layer is isotropic in the plane of the substrate, even if the substrate is textured. The magnetic layer is typically a Co-based alloy with h.c.p. structure, containing segregating elements such as Cr, Ta, other metals with limited solubility in Co, or oxides, and Pt to raise the magnetocrystalline anisotropy and thus the coercivity. The large angle grain boundaries in the Co promote segregation.

Thus the present invention permits isotropic media to be formed on textured substrates or on substrates with residual scratches, using a process which includes an elevated temperature and a Cr underlayer. The media are isotropic and have no sensitivity to residual scratches. The grain size is small to reduce noise. Segregation occurs readily at the elevated temperature at the large angle grain boundaries in the Co alloy to give high Hc and low noise. Such media are suitable for manufacture in in-line or static sputter systems and may be made on any substrate. Media have better uniformity and lower sensitivity to temperature than conventional oriented media.

BRIEF DESCRIPTION OF THE DRAWING

FIGS. 4A-1 and 4A-2 show B-H curves for a magnetic disk including a textured substrate, a sputtered Cr underlayer, and a CoCrTa magnetic layer. FIG. 4A-1 shows the B-H curve in the circumferential direction, whereas FIG. 4A-2 shows the B-H curve in the radial direction.

FIGS. 4C-1 and 4C-2 show B-H curves for a magnetic disk including a textured substrate, a 2 nm thick Al sublayer, a Cr underlayer and a CoCrTa magnetic layer. FIG. 4C-1 shows the B-H curve in the circumferential direction. FIG. 4C-2 shows the B-H curve in the radial direction.

FIGS. 4D-1 and 4D-2 show B-H curves for a magnetic disk including a textured substrate, a 2 nm thick Al sublayer, a Cr underlayer and a CoCrTa magnetic layer.

FIG. 4D-1 shows the B-H curve in the circumferential direction. FIG. 4D-2 shows the B-H curve in the radial direction.

FIGS. 4F-1 and 4F-2 show B-H curves for a magnetic disk including a textured substrate, a 16 nm thick Al sublayer, a Cr underlayer and a CoCrTa magnetic layer.

FIG. 4F-1 shows the B-H curve in the circumferential direction. FIG. 4F-2 shows the B-H curve in the radial direction.

FIG. 10b" is an electron diffraction pattern showing that the Cr underlayer of FIG. 10a has a random crystal orientation.

FIG. 11 illustrates a disk drive including a magnetic disk constructed in accordance with our invention.

DETAILED DESCRIPTION

A method for manufacturing magnetic media for longitudinal recording in accordance with our invention permits use of a high temperature sputtering process, a high sputtering rate, and use of segregant elements such as Cr and Ta in the magnetic Co alloy. Our invention also permits formation of high coercivity isotropic media which is substantially unaffected by surface texture features.

Figure 1:
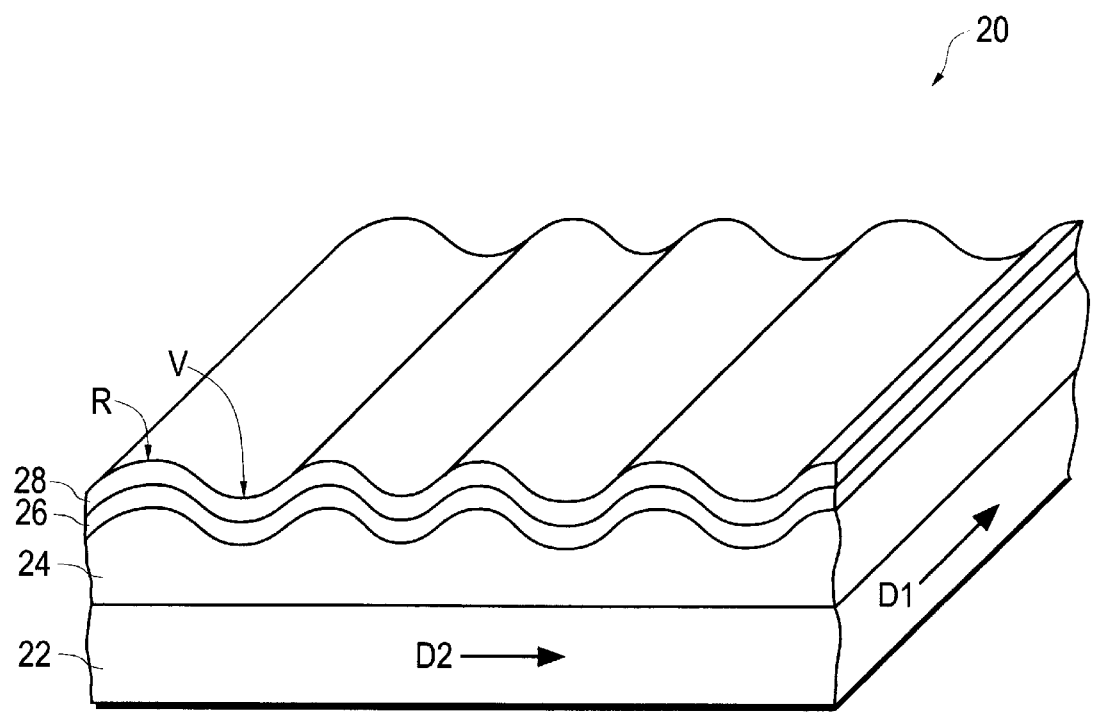
FIG. 1 schematically shows a prior art magnetic disk including a textured substrate.

FIG. 1 shows a prior art magnetic disk formed with a high temperature sputtering process.

Referring to FIG. 1, a prior art magnetic disk 20 includes an Al alloy substrate 22 covered with plated NiP layer 24. A texture pattern is schematically shown in disk 20 including a set of ridges R and valleys V extending in a direction D1. A Cr underlayer 26 and a Co alloy magnetic layer 28 are formed on NiP layer 24. Cr underlayer 26 is typically formed by sputtering after substrate 22 has been heated (e.g. to a temperature greater than 200° C.), and forms with a (200) crystal orientation. Co alloy magnetic layer 28 grows with a (11$\bar{2}$0) crystal orientation.

Figure 2:
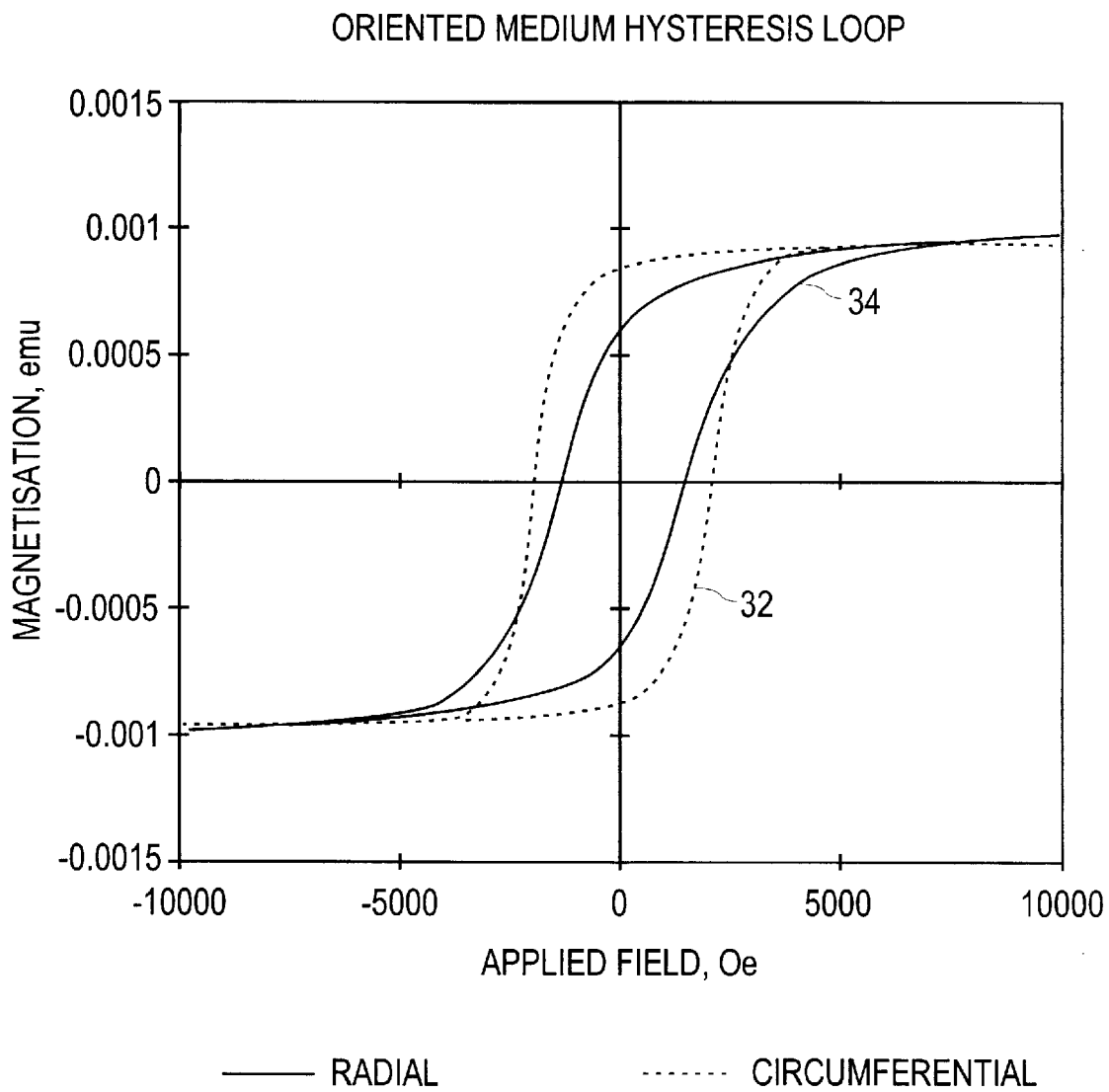
FIG. 2 shows a pair of B-H curves for the disk of FIG. 2.

FIG. 2 shows two B-H curves. A first B-H curve 32 shows the characteristics of magnetic film 28 along direction D1 and a second B-H curve 34 shows the characteristics of magnetic film 28 along a direction D2 perpendicular to direction D1. As can be seen, the coercivity $Hc_1$ along direction D1 is greater than coercivity $Hc_2$ along direction D2. One measure of the anisotropy of film 28 is the value $HcOR=Hc_1/Hc_2$. (HcOr is generally known in the orientation ratio of coercivity Hc). A typical prior art magnetic film has a HcOR value of about 1.4.

Figure 3:
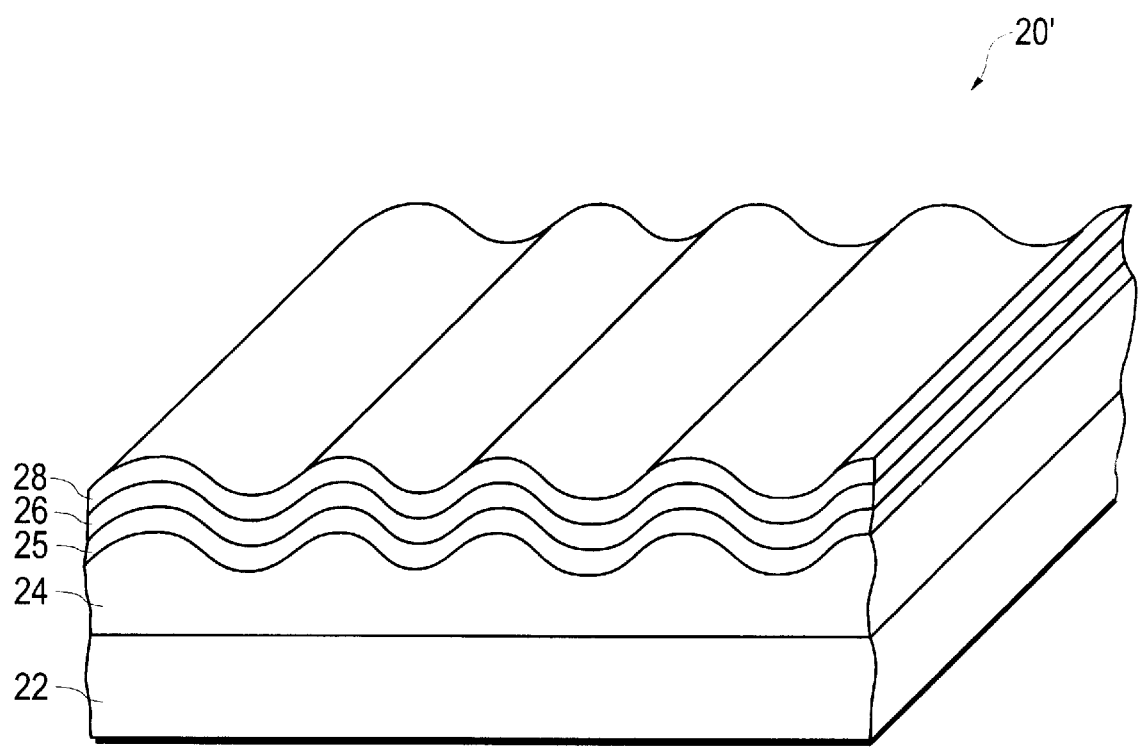
FIG. 3 schematically shows a magnetic disk formed on a textured substrate including a sublayer in accordance with our invention.
Figures 1, 4A:
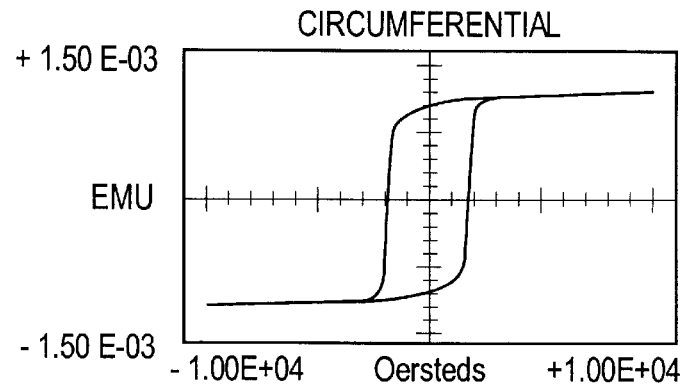
Figures 2, 4A:
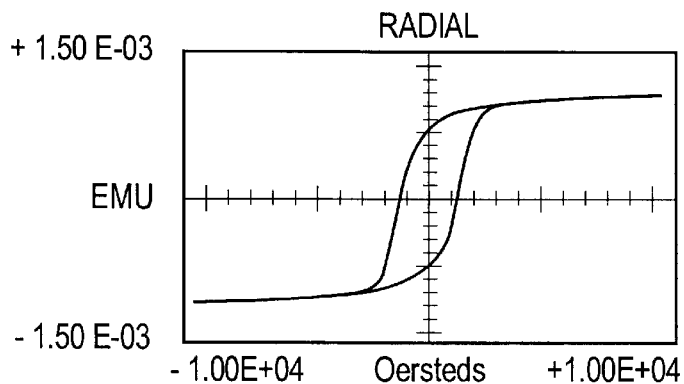
Figure 4B:
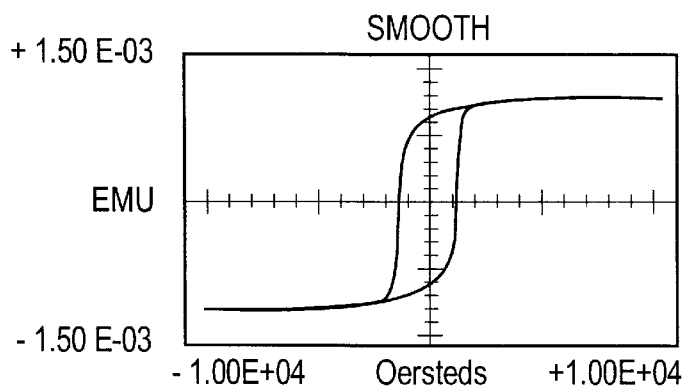
FIG. 4B shows a B-H curve for a magnetic disk including a smooth substrate, a sputtered Cr underlayer, and a CoCrTa magnetic layer.
Figures 1, 4C:
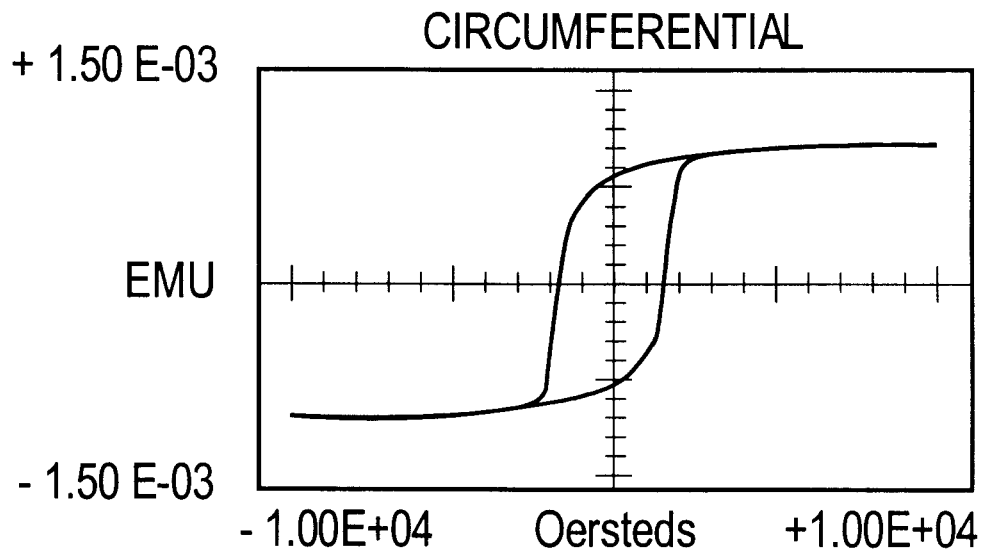
Figures 2, 4C:
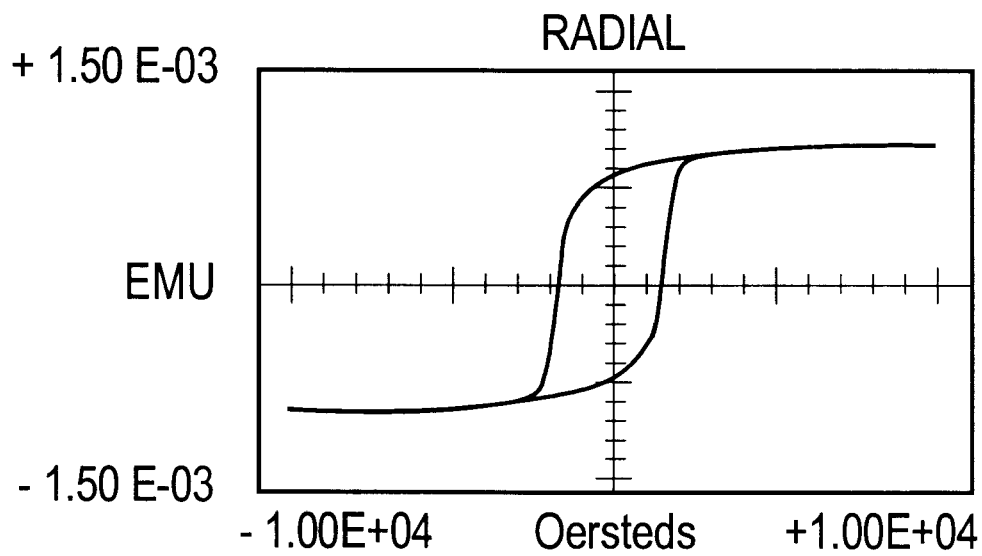
Figures 1, 4D:
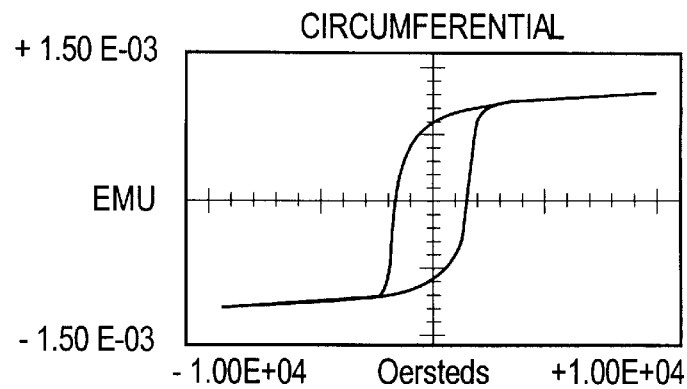
Figures 2, 4D:
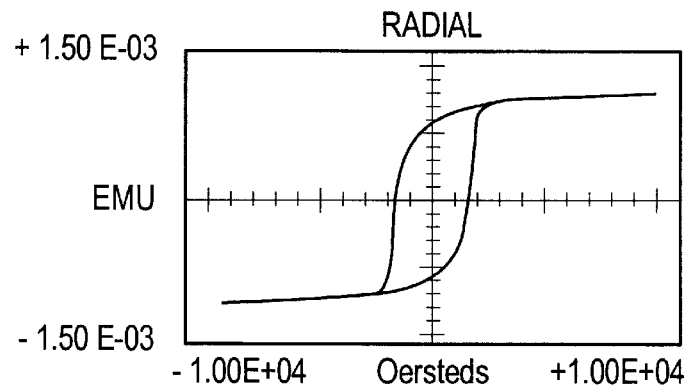
Figure 4E:
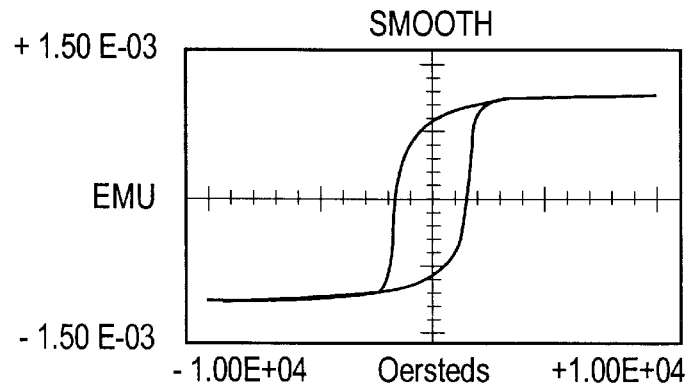
FIG. 4E shows a B-H curve for a magnetic disk including a smooth substrate, a 2 nm thick Al sublayer, a Cr underlayer and a CoCrTa magnetic layer.
Figures 1, 4F:
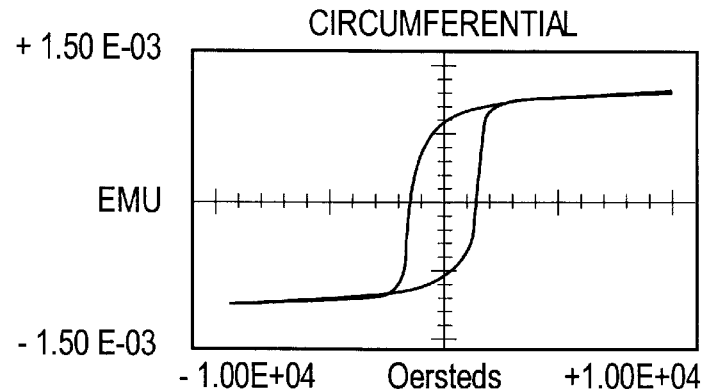
Figures 2, 4F:
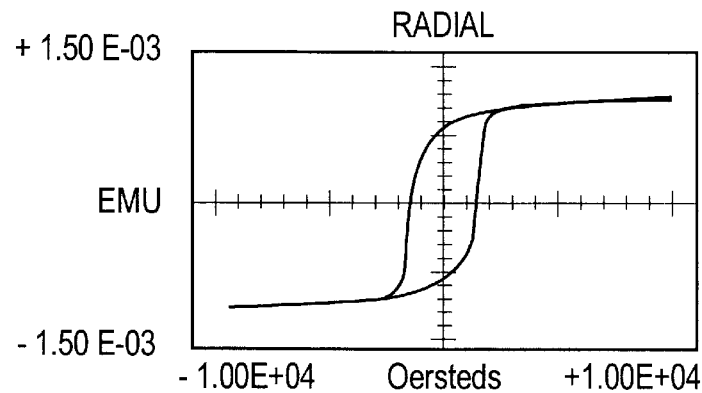
Figure 4G:
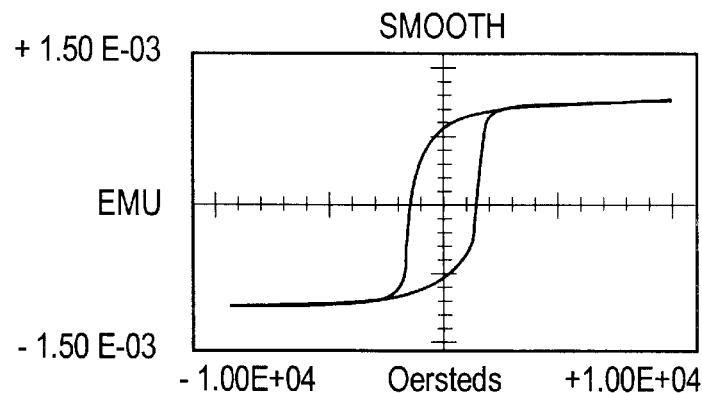
FIG. 4G shows a B-H curve for a magnetic disk including a smooth substrate, a 16 nm thick Al sublayer, a Cr underlayer and a CoCrTa magnetic layer.

FIG. 3 shows a magnetic disk 20' in accordance with our invention, including a sublayer 25 formed between NiP layer 24 and Cr underlayer 26. Sublayer 25 is a crystalline film (typically metallic, nonmagnetic and formed by sputtering) which encourages Cr layer 26 to grow in a manner other than with a preferred (200) orientation. In one embodiment, sublayer 25 causes the crystals of Cr layer 26 to grow in a more random manner. In another embodiment, sublayer 25 causes the Cr crystals to grow with a preferred (110) orientation. This prevents Cr film 26 from growing with a preferred (200) orientation, and prevents Co alloy film 28 from growing with the (11$\bar{2}$0) orientation associated with texture induced anisotropy. Sublayer 25 should be crystalline to promote epitaxy with the Cr but should not have a (200) orientation. (Film 28 grows in an epitaxial relation with Cr underlayer 26.)

In some embodiments, sublayer 25 can be formed from a material that does not include Cr (or does not include a substantial amount of Cr).

MATERIALS USED IN SUBLAYER 25

In one embodiment, sublayer 25 is a material with a B2 crystal structure, such as NiAl (50% Ni, 50% Al by mole). (The term "B2 crystal structure" is well known in the art, and is also sometimes referred to as a cesium chloride structure.) NiAl tends to grow with a random orientation. The crystal lattice spacing of NiAl closely matches that of Cr, and forces the Cr to grow with a random orientation, even when sputtering occurs at a high substrate temperature. (Cr has a BCC crystal structure.) In lieu of NiAl, other B2 materials can be used, e.g. (Cu, Co, Ni, Pd, Fe, Ru, Cr, V) Al, (Ag, Au) Mg, (Co, Cu, Ni, Pd, Fe, Ag, Au) Zn, etc. When sublayer 25 is a B2 crystal structure material, the lattice parameter a preferably equals between 0.26 and 0.32 nm. Such materials typically grow with a (110) orientation or a random orientation.

The reference to (Cu, Co, Ni, Pd, Fe, Ru, Cr, V) Al in the above paragraph means a B2 material of 50% Al (by mole), with the remaining 50% comprising one or more of Cu, Co, Ni, Pd, Fe, Ru, Cr, or V. The reference to (Co, Cu, Pd, Ni, Fe, Ag, Au) Zn means a B2 material that is 50% Zn (by mole), with the remaining 50% comprising one or more of Co, Cu, Pd, Ni, Fe, Ag or Au.

Of importance, some of the above-listed B2 materials form with either B2 or BCC structures, depending on the substrate temperature during deposition. These materials can be used in their BCC form when they form with a (110) orientation or a random orientation.

In lieu of the above-mentioned B2 materials, materials having a BCC crystal structure that grow with a (110) orientation (or a random orientation) can be used as sublayer 25. Such materials include Cr (when the Cr is sputtered at room temperature), V, W, Mo, and alloys thereof. Other BCC materials include Cr with less than 30 atomic % Ti, Ni, Al, Si or Co. The lattice spacing parameter a should be between 0.26 and 0.32 nm.

(Cr grows with a (200) orientation when sputtered at high temperatures, and a (110) orientation when sputtered at low temperatures.)

Crystalline materials other than the above-mentioned materials can be used as long as (a) the lattice spacing of the sublayer material tends to match that of the Cr underlayer; and (b) the Cr crystal orientation is altered by the sublayer so that the Cr does not grow in a preferred (200) orientation.

In another embodiment, instead of forming sublayer 25 from a material with a B2 or BCC crystal structure, sublayer 25 comprises a material having a FCC crystal structure such as Cu, Al or alloys thereof. Such materials tend to grow with a (111) orientation. The lattice at the top of the film has three-fold symmetry, and tends to cause the Cr to grow randomly. FCC materials that grow with a random crystal orientation can also be used. For FCC materials, the lattice spacing parameter $a_f$ should be 1.15$a_{bcc}$ (plus or minus 10%) or 1.41$a_{bcc}$ (plus or minus 10%), i.e. $a_f$=0.30 to 0.45 nm, and typically about 0.40. (The term 1.15$a_{bcc}$ means the quantity 1.15 times the lattice parameter a for the BCC material used to form underlayer 26, i.e. 1.15 times the lattice parameter of Cr.)

In another embodiment, sublayer 25 is a material having a HCP structure such as Ti. Ti tends to grow with a (0002) orientation. Other HCP materials include Zn, Mg, alloys of Ti, Zn and Mg, and nonmagnetic Co alloys, e.g. $Co_{70}Cr_{30}$. Preferably $a_{hcp}$ is 0.26 to 0.39 nm.

USE OF MAGNETIC MEDIA IN A DISK DRIVE

A disk 20' in accordance with the present invention is typically used in a disk drive 80 (FIG. 11) in which disk 20' is mounted on a rotor shaft 82 which, in turn, is rotated by a motor 84. A pair of read-write heads 86a, 86b are mounted on the end of associated arms 88a, 88b. Heads 86a, 86b can be ferrite heads, thin film heads, magneto-resistive heads, or other types of read-write heads. Heads 86a, 86b "fly" in proximity to disk 20', where they can write data to and read data from the magnetic film on sides 90a, 90b of disk 20', respectively.

Arms 88a, 88b can be moved inward or outward (directions 92 and 94, respectively) to permit heads 86a, 86b to access data tracks at different locations of the disk. Motion of arms 88a, 88b are controlled by a servo motor (not shown). Examples of disk drives are disclosed in U.S. Pat. Nos. 4,949,202 (Kim); 5,025,335 (Stefansky); 5,027,241 (Hatch); and 5,025,336 (Morehouse), each of which is incorporated herein by reference. A disk in accordance with our invention can be incorporated in other types of disk drives as well.

EXAMPLES

A set of Al alloy substrates were covered with 8 micron thick NiP by electroless plating and then processed as described below.

A first substrate was mechanically textured with a circumferential texture having an Ra of about 4 nm. Substrate A was then heated to a temperature of 230° C., and then a 50 nm thick Cr layer and a 42 nm thick CoCrTa magnetic layer were deposited on the NiP. The resulting magnetic disk is hereinafter referred to as disk A.

A second substrate was superpolished. The second substrate was heated to a temperature of 230° C., and then a 50 nm thick Cr layer and a 42 nm thick CoCrTa layer were deposited thereon. The resulting magnetic disk is disk B.

A third substrate was mechanically textured and coated with a 2 nm thick Al layer. The third substrate was then heated to a temperature of about 230° C., and then coated with a 50 nm thick Cr layer and a 42 nm thick CoCrTa layer. The resulting magnetic disk is disk C.

A fourth substrate was mechanically textured, heated to a temperature of 230° C., and coated with a 2 nm thick Al layer, a 50 nm thick Cr layer and a 42 nm thick CoCrTa layer. The resulting magnetic disk is disk D. (Note that the difference between disks C and D is that in disk C, the substrate was heated after Al deposition, whereas in disk D, the substrate was heated before Al deposition.)

A fifth substrate was superpolished. The fifth substrate was heated to a temperature of 230° C., and coated with a 2 nm thick Al layer, a 50 nm thick Cr layer and a 42 nm thick CoCrTa layer. The resulting magnetic disk is disk E.

A sixth substrate was mechanically textured. The sixth substrate was then heated to a temperature of 230° C., and then coated with 16 nm thick Al, 50 nm thick Cr and a 42 nm thick CoCrTa layer. The resulting magnetic disk is disk F.

A seventh substrate was superpolished. The seventh substrate was coated with 16 nm thick Al, heated to 230° C., 50 nm thick Cr and 42 nm thick CoCrTa. The resulting magnetic disk is disk G.

For disks A to G, the Cr was sputtered with a power of 2.0 kw for 5 seconds, at 6.5 mTorr of pressure with a 200 V substrate bias, and the CoCrTa was sputtered with a power of 2 kw for 5 seconds at 11 mTorr with a 200 volt substrate bias. The CoCrTa was 10% Cr, 6% Ta, and the remainder Co. Sputtering was performed in an Intevac sputtering machine model 250A.

FIG. 4 shows the B-H curves for disks A to G as set forth in Table I below.

TABLE I

| B-H curve | Description |
|---|---|
| 4A-1 | B-H curve for disk A in the circumferential direction |
| 4A-2 | B-H curve for disk A in the radial direction |
| 4B | B-H curve for disk B |
| 4C-1 | B-H curve for disk C in the circumferential direction |
| 4C-2 | B-H curve for disk C in the radial direction |
| 4D-1 | B-H curve for disk D in the circumferential direction |
| 4D-2 | B-H curve for disk D in the radial direction |
| 4E-1 | B-H curve for disk E in the circumferential direction |
| 4E-2 | B-H curve for disk E in the radial direction |
| 4F | B-H curve for disk F |
| 4G-1 | B-H curve for disk G in the circumferential direction |
| 4G-2 | B-H curve for disk G in the radial direction |

Figure 5:
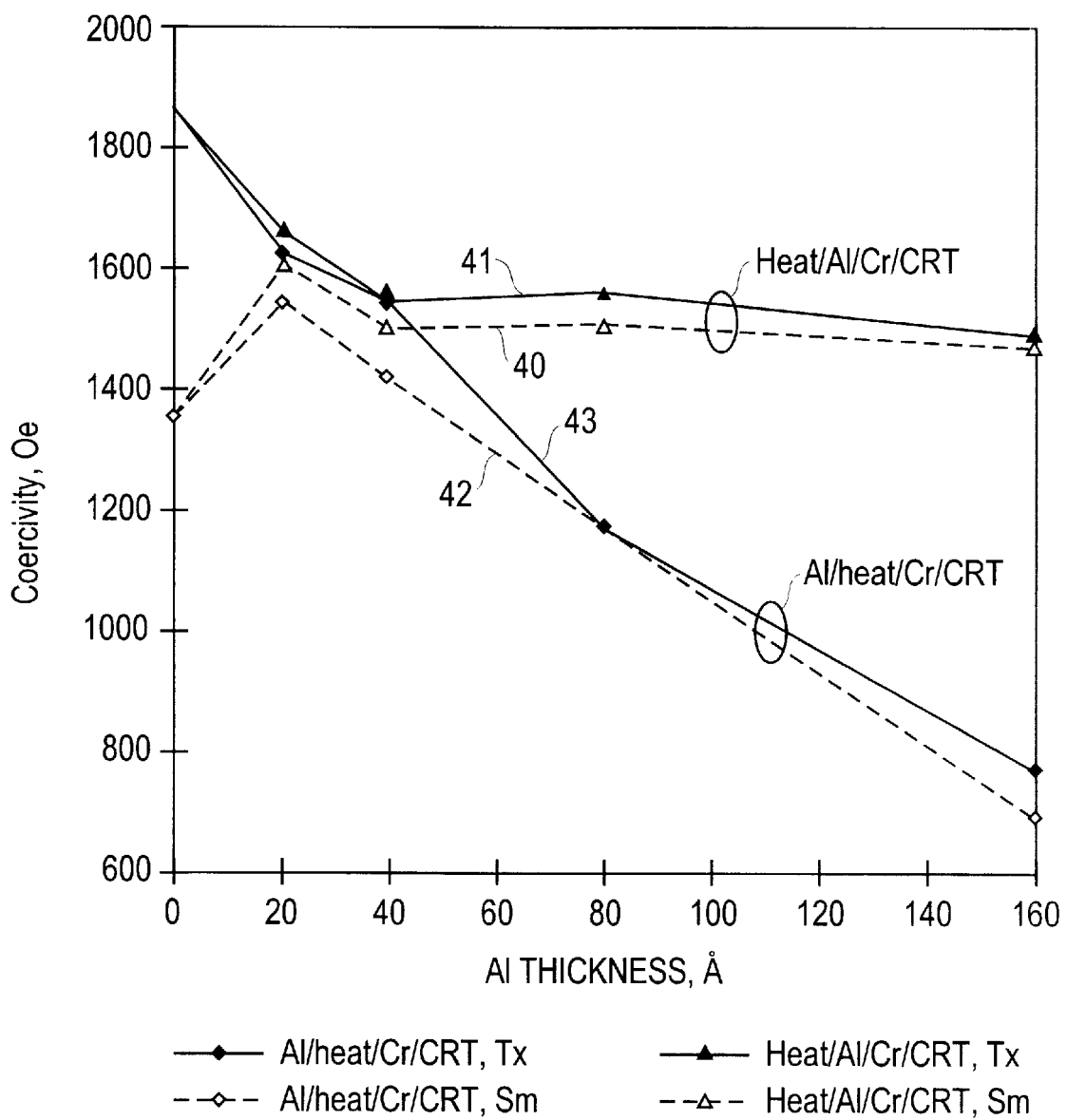
FIG. 5 shows the relation between coercivity and the thickness of an Al sublayer in a magnetic disk.

Table II summarizes magnetic data derived from FIG. 5.

TABLE II

| Disk | Curve | Hc (Oe) | Mrt (memu/cm$^2$) | S | S* | Mst (memu/cm$^2$) | Manufacturing Process |
|---|---|---|---|---|---|---|---|
| A | 4A-1 | 1805 | 2.14 | .869 | .903 | 2.46 | Texture/heat/Cr/CoCrTa |
| A | 4A-2 | 1250 | 1.53 | .650 | .557 | 2.35 | Texture/heat/Cr/CoCrTa |
| B | 4B | 1310 | 2.00 | .785 | .884 | 2.54 | Smooth/heat/Cr/CoCrTa |
| C | 4C-1 | 1619 | 1.70 | .762 | .756 | 2.22 | Texture/Al (2 nm)/heat/Cr/CoCrTa |
| C | 4C-2 | 1602 | 1.64 | .743 | .781 | 2.20 | Texture/Al (2 nm)/heat/Cr/CoCrTa |
| D | 4D-1 | 1634 | 1.77 | .747 | .796 | 2.37 | Texture/heat/Al (2 nm)/Cr/CoCrTa |
| D | 4D-2 | 1628 | 1.71 | .757 | .772 | 2.25 | Texture/heat/Al (2 nm)/Cr/CoCrTa |
| E | 4E | 1539 | 1.70 | .736 | .774 | 2.31 | Smooth/heat/Al (2 nm)/Cr/CoCrTa |
| F | 4F-1 | 1432 | 1.72 | .737 | .780 | 2.33 | Texture/heat/Al (16 nm)/Cr/CoCrTa |
| F | 4F-2 | 1436 | 1.70 | .709 | .787 | 2.39 | Texture/heat/Al (16 nm)/Cr/CoCrTa |
| G | 4G | 1406 | 1.71 | .721 | .781 | 2.36 | Smooth/heat/A1 (16 nm)/Cr/CoCrTa |

As can be seen, for disk A, magnetic coercivity in the circumferential direction (i.e. parallel to the texture lines) was 1805 Oe, whereas in the radial direction (i.e. perpendicular to the texture lines) coercivity was 1250 Oe. The HcOR was 1805/1250 or about 1.44. Mrt, S, S* and Mst similarly vary, depending upon whether these values are taken from B-H curves parallel to or perpendicular to the texture lines. (As mentioned above, Mrt is magnetic remanence times thickness. Mst is saturation magnetization times thickness. S and S* are parameters defined in U.S. Pat. No. 4,749,459, incorporated by reference.)

Curve 4B was generated using a smooth disk, and therefore exhibited isotropic magnetic characteristics. The Hc, Mrt, S, S* and Mst values were all in between the corresponding values for curves 4A-1 and 4A-2.

Disk C was manufactured using the same process as disk A, except prior to heating, a 2 nm thick Al layer was sputtered onto the disk. In the circumferential direction, coercivity was 1619 Oe, whereas in the radial direction, coercivity was 1602 Oe. HcOR was 1.01. Thus, a very thin Al layer (only 2 nm thick) was sufficient to cause almost isotropic coercivity characteristics. The thin Al layer also caused the other magnetic parameters (Mrt, S, S*, and Mst) to become more isotropic.

It is noted that in disk C, coercivity is slightly less than the coercivity of disk A in the circumferential direction. However, this is a small price to pay in return for a reduced HcOR value. (It is also noted that in disk C, coercivity is higher in the radial direction than disk A.)

Disk D was manufactured with the same process as disk C, except the substrate was heated prior to Al deposition. As can be seen, HcOR for disk D was about 1.00. Thus, the thin Al layer caused the coercivity to become substantially isotropic, regardless of whether the substrate was heated before or after Al deposition.

Disk E was manufactured in the same way as disk D, except without texturing. The magnetic characteristics of disk D were isotropic. Coercivity was somewhat less for disk E than disk D.

Disks F and G were made in the same way as disks D and E, respectively, except using 16 nm thick Al instead of 2 nm thick Al. As can be seen, in disk F, coercivity was essentially isotropic (HcOR=1.00), as were the other magnetic parameters. Disk G also had isotropic characteristics.

In summary, the above data demonstrates that an Al sublayer causes the coercivity to be substantially isotropic in the plane of the magnetic film. A slight drop in coercivity Hc and squareness S in the circumferential direction is experienced, but this should be a small price to pay for improved isotropic characteristics.

FIG. 5 shows circumferential coercivity versus Al thickness for disks manufactured as set forth in Table III below.

TABLE III

| Curve | Substrate | Manufacturing Process |
|---|---|---|
| 40 | Smooth | heated and then Al, Cr and CoCrTa deposited |
| 41 | Textured | heated and then Al, Cr and CoCrTa deposited |
| 42 | Smooth | Al deposited, heated, and then Cr and CoCrTa deposited |
| 43 | Textured | Al deposited, heated, and then Cr and CoCrTa deposited |

As can be seen in FIG. 5, for no Al layer (thickness=0), coercivity for textured disks was greater than for smooth disks (about 1850 Oe versus 1350 Oe). A thin (2 nm) Al layer sublayer causes the Hc values to converge to a value of about 1600 Oe. For thicker Al films in which the substrate is heated prior to Al deposition, coercivity tends to remain constant as Al thickness increases. For disks heated after Al deposition, coercivity tends to drop with increased Al thickness.

Of interest, an Al film tends to cause disk coercivity (for disks with a textured substrate) to be similar to the coercivity of a smooth, untextured disk. This behavior occurs for textured and smooth disks in which Al is deposited before heating and for textured and smooth disks in which Al is deposited after heating.

Figure 6:
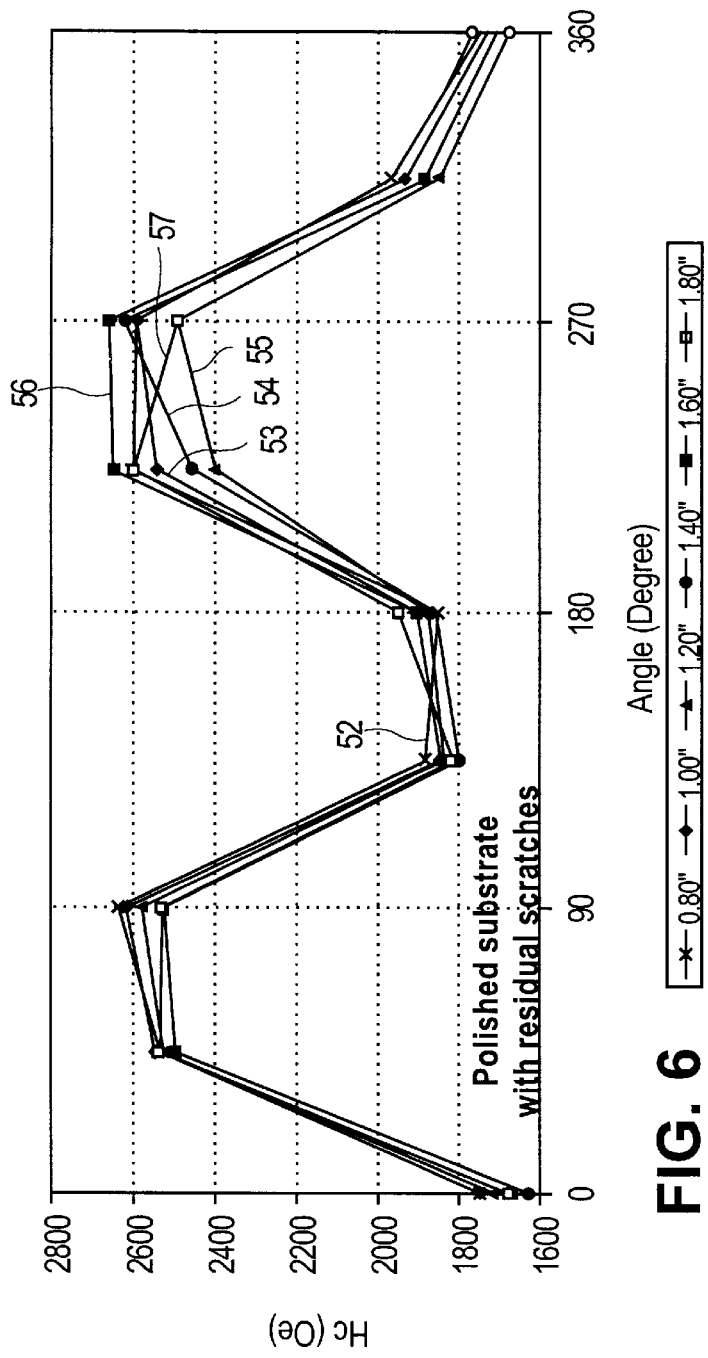
FIG. 6 shows the variation in coercivity Hc along a magnetic disk track caused by residual substrate scratches in a magnetic disk lacking a sublayer.
Figure 7:
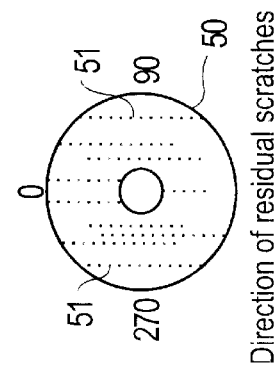
FIG. 7 schematically shows the magnetic disk used to generate the data of FIG. 6.
Figure 8:
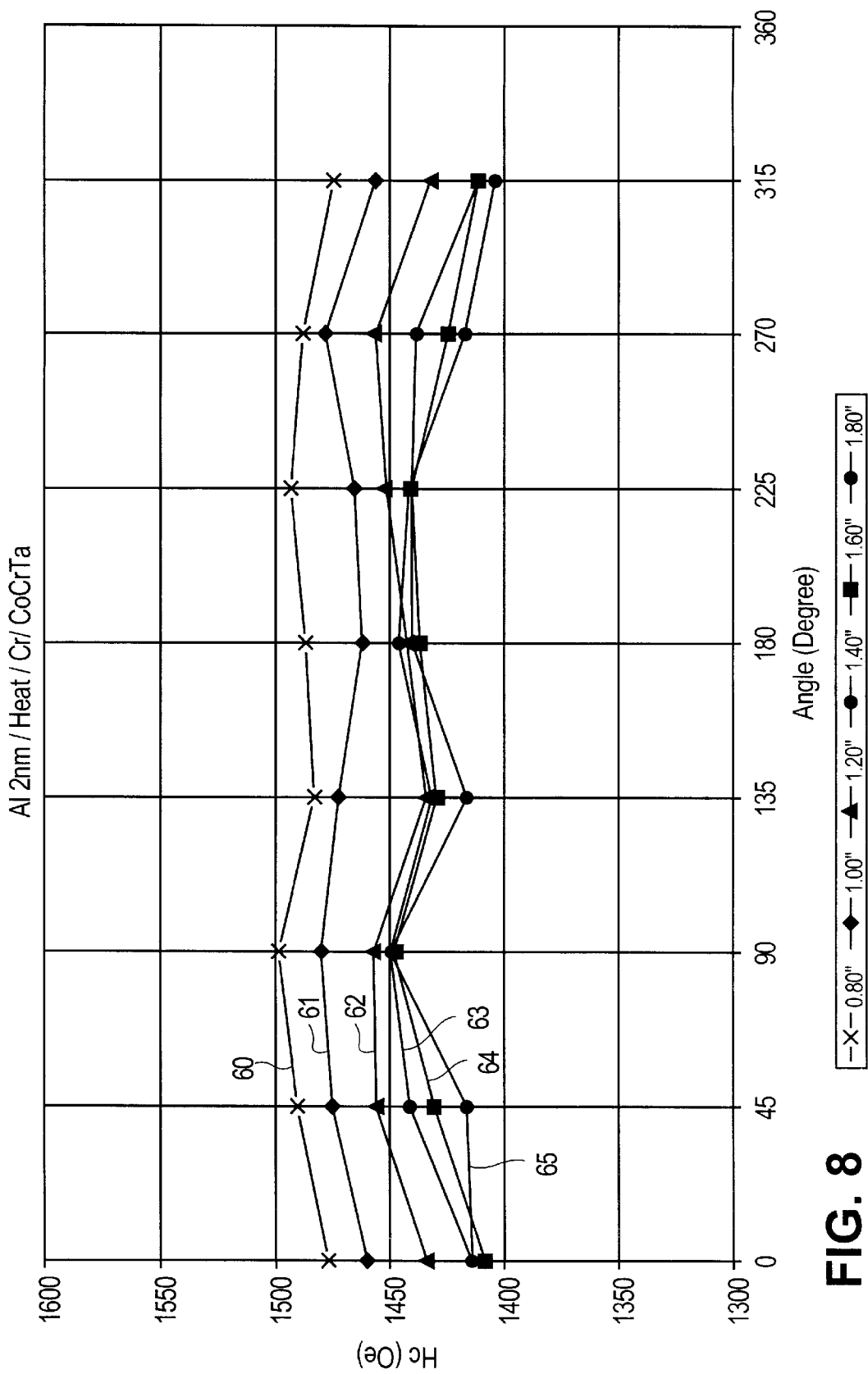
FIG. 8 shows the variation in coercivity Hc along a magnetic disk track for a magnetic disk including an Al sublayer.

One advantage of a disk made in accordance with our invention is that we avoid scratch induced variation in coercivity. For example, FIG. 6 shows variation in coercivity for a polished magnetic disk 50 (FIG. 7) having residual parallel scratch marks 51. As can be seen, coercivity varies between about 1700 and 2600 Oe, as one measures coercivity around a track. Measurements were taken at 0.8, 1, 1.2, 1.4, 1.6, and 1.8 inches from the center of the disk (curves 52, 53, 54, 55, 56 and 57, respectively). By providing an Al sublayer, we can avoid such unwanted coercivity variation. FIG. 8 shows coercivity Hc for a magnetic disk similar to that of FIGS. 6 and 7, but including a 2 nm thick Al sublayer. Measurements were taken 0.8, 1, 1.2, 1.4, 1.6, and 1.8 inches from the center of the disk (curves 60, 61, 62, 63, 64 and 65, respectively). As can be seen, the variation in coercivity for the disk of FIG. 8 is substantially less than for FIG. 6, suggesting that the Al sublayer prevents Hc variation caused by residual scratches.

In FIG. 8, coercivity varies between about 1400 and 1500 Oe. Variation appears to be related to the distance from the center of the disk. It is believed that this is caused by temperature variation across the disk surface during sputtering.

In a second experiment, we provided an NiAl sublayer instead of an Al sublayer. Table IV describes a set of disks H to S. Each disk H to S included an Al alloy substrate, NiP plated onto the Al substrate, a Cr underlayer, a CoCrPtTa magnetic alloy layer, and a 10 nm thick carbon overcoat. The CoCrPtTa magnetic layer included 16 At. % Cr, 12 At. % Pt and 4 At. % Ta, with the remainder Co. Sputtering was accomplished with an Intevac 250A system. The NiAl, Cr, CoCrPtTa and carbon were sputtered at a pressure of 10 mTorr, 6.5 mTorr, 11 mTorr, and 7 mTorr respectively. A substrate bias of 300 v was used during sputtering of Cr and CoCrPtTa.

example, if the NiAl is 56 nm thick, Mc equals about 2563 Oe, whereas if the NiAl is only 14 nm thick, Hc is 1812 Oe (this is for the case of a Cr layer that is 41 nm thick). Thus the penalty one pays in coercivity by providing the NiAl layer can be mitigated by making the NiAl thicker. (Thick NiAl causes Cr and therefore CoCrTaPt to grow with larger grains and better isolation. This raises coercivity Hc.) A similar result is achieved for a disk with a 20.5 nm thick Cr layer.

Figure 9A:
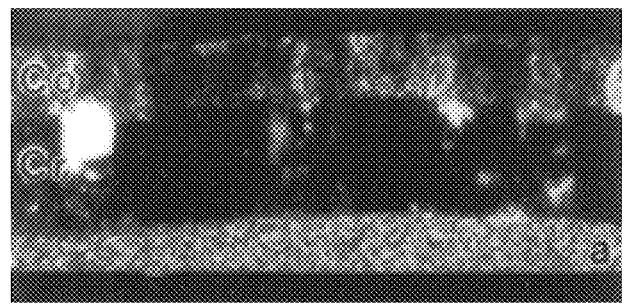
FIG. 9a is a TEM photograph of a magnetic disk comprising a substrate, a Cr underlayer, and a Co alloy magnetic layer constructed in accordance with the prior art.
Figure 9B:
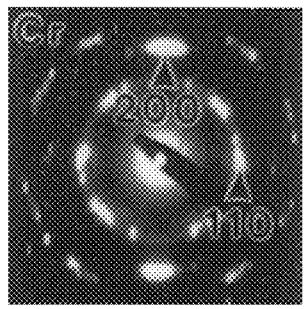
FIG. 9b is an electron diffraction pattern indicating that the Cr underlayer of the disk of FIG. 9a is oriented such that (200) film plane is parallel to the major surface of the magnetic disk.
Figure 9C:
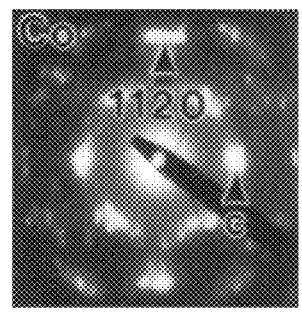
FIG. 9c is an electron diffraction pattern indicating that the Co alloy film is oriented such that the (11$\bar{2}$0) film plane is parallel to the major surface of the magnetic disk.

FIGS. 9 and 10 illustrate the results of another experiment performed using an NiAl sublayer. FIG. 9a is a TEM photograph of a magnetic disk including a substrate, sputtered Cr underlayer, and sputtered Co alloy magnetic layer constructed in accordance with the prior art. The Cr underlayer and Co alloy were sputtered while the substrate was heated. As can be seen in the electron diffraction pattern in FIG. 9b, the Cr underlayer grew predominantly with a (200) crystal orientation. As can be seen in FIG. 9c, the Co alloy layer grew with a predominantly (11$\bar{2}$0) crystal orientation. The Co alloy grew in an epitaxial relation with the Cr underlayer.

Figure 10A:
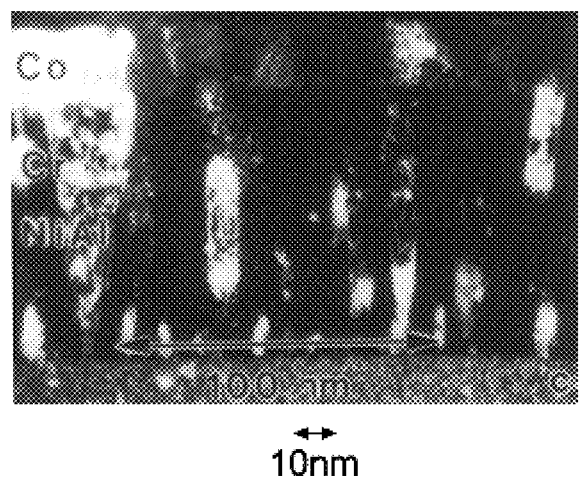
FIG. 10a is a TEM photograph of a magnetic disk constructed in accordance with the invention including a substrate, a NiAl sublayer formed on the substrate, a Cr underlayer formed on the NiAl sublayer, and a Co magnetic alloy formed on the Cr underlayer.

FIG. 10a is a TEM photograph of a magnetic disk in accordance with our invention, including an NiAl sublayer, Cr underlayer and Co alloy magnetic layer sputtered onto a substrate in that order. FIG. 10a shows that the grain size of the Co alloy magnetic layer is smaller if the NiAl sublayer is formed.

Figure 10B:
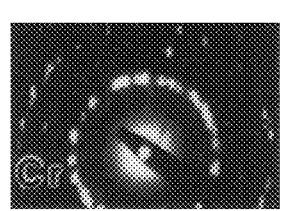
FIG. 10b' is an electron diffraction pattern showing that the NiAl sublayer of FIG. 10a has a random crystal orientation and showing that there is an epitaxial relation between the NiAl and Cr, and between the Cr and the Co magnetic alloy.

FIG. 10b' is an electron diffraction pattern showing that the NiAl sublayer of FIG. 10a has a random crystal orientation.

Figure 10C:
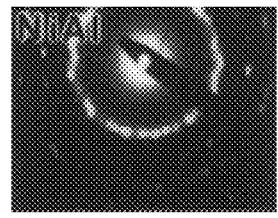
FIG. 10c is an electron diffraction pattern showing that the Co alloy layer of FIG. 10a has an almost random orientation.
Figure 10C:
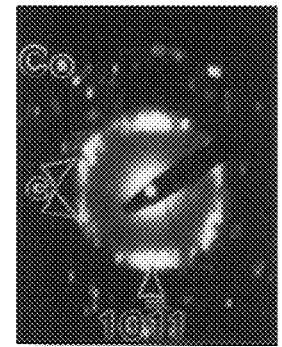

FIG. 10b" is an electron diffraction pattern showing that the Cr underlayer of FIG. 10a grew with a random crystal orientation. FIG 10c is an electron diffraction pattern showing that the Co alloy magnetic layer likewise grew with an almost random crystal orientation. The Cr grew in an epitaxial relation on the NiAl, and the Co alloy grew in an epitaxial relation with the Cr.

Table V below shows additional data for magnetic disks including an Al alloy substrate plated with NiP. The disks

TABLE IV

| Disk | Substrate | NiAl Thickness (nm) | Cr Thickness (nm) | CoCrPtTa Thickness (nm) | Hc | Mrt | Mst | S* | Sq | HcOR | Hr | S*r |
|---|---|---|---|---|---|---|---|---|---|---|---|---|
| H | Textured | 0 | 41 | 22 | 2693 | 0.55 | 0.65 | 0.573 | 0.834 | 1.33 | 3106 | 0.773 |
| K | Smooth | 0 | 41 | 22 | 2536 | 0.55 | 0.74 | 0.576 | 0.725 | 1.00 | 2970 | 0.774 |
| N | Textured | 14 | 41 | 22 | 1812 | 0.45 | 0.67 | 0.430 | 0.661 | 0.98 | 2316 | 0.713 |
| O | Textured | 28 | 41 | 22 | 2149 | 0.47 | 0.72 | 0.533 | 0.665 | 0.98 | 2659 | 0.722 |
| P | Textured | 42 | 41 | 22 | 2329 | 0.45 | 0.72 | 0.576 | 0.674 | 0.99 | 2787 | 0.760 |
| Q | Textured | 56 | 41 | 22 | 2563 | 0.48 | 0.66 | 0.636 | 0.734 | 0.99 | 2896 | 0.781 |
| R | Textured | 14 | 20.5 | 22 | 1522 | 0.41 | 0.72 | 0.363 | 0.577 | 1.01 | 2169 | 0.582 |
| S | Textured | 56 | 20.5 | 22 | 2348 | 0.49 | 0.73 | 0.648 | 0.689 | 0.96 | 2722 | 0.801 |

All sputtered layers except the NiAl were sputtered after heating the substrate to 250° C. (The NiAl was sputtered onto the substrate at room temperature.)

For all disks, the saturation magnetization of the magnetic layer was about 320 emu/cm$^3$.

As can be seen from Table IV, for textured substrates without the NiAl, HcOR was between 1.23 and 1.33. We were able to reduce HcOR to 1.0 by eliminating the texture and using a super smooth texture. We were also able to reduce HcOR to about 1.0 by providing the NiAl sublayer even for textured disks.

Also as can be seen from Table IV, one can increase coercivity Hc by increasing the NiAl thickness. For were heated to 200° C., and 50 nm thick Cr and 40 nm thick CoCrTa were sputtered thereon. The disks included either a Cu sublayer or a Ti sublayer. For textured disks in Table V, coercivity was measured in the circumferential direction.

TABLE V

| Sublayer | Hc, Textured Disk | Hc, Polished Disk | % Difference |
|---|---|---|---|
| 38 nm thick Cu | 1137 | 1098 | 3.6 |
| 76 nm thick | 1124 | 1145 | −1.8 |

TABLE V-continued

| Sublayer | Hc, Textured Disk | Hc, Polished Disk | % Difference |
|---|---|---|---|
| Cu 114 nm thick | 1136 | 1158 | −1.9 |
| Cu 15 nm thick | 617 | 777 | −20.6 |
| Ti 30 nm thick | 640 | 773 | −17.2 |
| Ti 45 nm thick | 707 | 811 | −12.8 |

For disks including a Cu sublayer, textured and polished disks exhibited nearly identical coercivities (i.e. within 2 to 3% of one another). This demonstrates that for these disks, the substrate texture had little or no effect on coercivity.

For disks including a Ti sublayer, the polished disks exhibited higher coercivity so there was some effect of substrate texture on coercivity. Also, coercivity was fairly low.

In summary, it has been shown that a crystalline sublayer (typically a metal) that prevents a Cr film from growing with a (200) crystal orientation can be used to cause a Co alloy magnetic film to grow in a manner other than with a preferred (11$\bar{2}$0) crystal orientation, and in a manner that is not dependent on the substrate texture. The resulting Co film is substantially isotropic in the plane of the magnetic film.

While the invention has been described with respect to specific embodiments, those skilled in the art will appreciate that modifications can be made without departing from the spirit and scope of the invention. For example, in lieu of Cr, layer 26 can be an alloy of Cr. In one embodiment, the Cr is alloyed with another material such as Ta, V or Mo. Cr can be alloyed with other elements as well, but the Cr alloy should have a BCC crystal structure. Layer 26 is typically between 5 and 100 nm thick.

As mentioned above, the magnetic alloy is typically a Co based alloy, and in some embodiments it can be a CoCr alloy or a CoNi alloy. The magnetic alloy is typically a CoCrX alloy where X is either Pt, Ta or both. The magnetic alloy can contain other materials as well.

In one embodiment, Co alloy magnetic layer 28 comprises CoCrTaPt, wherein the Cr is between 0 and 25% Cr, the Pt is from 0 to 20% (and typically about 12 to 17%) and the Ta is from 0 to 15%. (These percentages are in atomic percent.)

Cr layer 26 and magnetic layer 28 are typically sputtered at an elevated temperature. For example, in one embodiment, substrate 22 is heated to a temperature greater than or equal to about 200° C. during or prior to sputtering layers 26 and 28. If the substrate temperature is too great, it will either warp or cause the plated NiP layer to crystallize (plated NiP is typically amorphous). Generally, the substrate temperature is kept below about 350° C.

In some embodiments, the substrate is heated before deposition of sublayer 25, but in other embodiments this is not required. Sublayer 25 is typically between 0.5 and 10 nm thick and in one embodiment, 2 nm thick. The surface upon which sublayer 25 is formed can have a roughness Ra greater than 0.5 nm and less than 5 nm as measured by atomic force microscope. Formation of sublayer 25 typically does not contribute significantly to the overall roughness Ra of the disk, and generally contributes less than about 2 nm to the overall disk surface roughness Ra.

NiP layer 26 is typically 6 to 10 μm thick and typically 8 μm.

In lieu of a NiP coated Al substrate, other substrate materials such as glass can be used. In addition, vacuum deposition techniques other than sputtering, e.g. evaporation can be used. The various layers in magnetic media in accordance with our invention can be of various appropriate thicknesses. The protective overcoat can be materials other than carbon. (For example, the protective overcoat can be $ZrO_2$ or hydrogenated carbon.) Accordingly, all such changes come within our invention.

I claim:

1. A method for manufacturing a magnetic disk comprising the steps of:

forming a crystalline layer on a substrate;

causing the surface of the structure formed by the preceding process step to have a temperature of at least 150° C.;

depositing a layer comprising Cr on said crystalline layer, and in an epitaxial relation with said crystalline layer, the crystallites within said layer comprising Cr having a substantially random orientation, said step of depositing being performed after said step of causing; and forming a magnetically isotropic Co based magnetic layer on said layer comprising Cr and in an epitaxial relation with said layer comprising Cr.

2. Method of claim 1 wherein said layer comprising Cr is more than 50% Cr, has a BCC crystal structure, and said Co based magnetic layer has a HCP crystal structure.

3. Method of claim 1 wherein said crystalline layer is metallic.

4. Method of claim 1 wherein said substrate has an average surface roughness Ra greater than about 0.5 nm as measured by an atomic force microscope.

5. Method of claim 4 wherein said substrate has an average surface roughness Ra less than about 5 nm as measured by an atomic force microscope.

6. Method of claim 1 wherein said substrate has a circumferential texture.

7. Method of claim 1 wherein said substrate has randomly oriented scratches.

8. Method of claim 1 wherein said crystalline layer is between 0.5 and 10 nm thick.

9. Method of claim 8 wherein said crystalline layer has a roughness Ra less than about 2 nm, and is non-magnetic.

10. Method of claim 1 wherein said step of forming a crystalline layer is performed without first heating said substrate.

11. Method of claim 1 wherein said substrate comprises an Al alloy disk covered with NiP, said method further comprising the step of circumferentially texturing said NiP, and heating said substrate prior to said steps of depositing said layer comprising Cr and forming said magnetic layer.

12. Method of claim 1 wherein said substrate comprises an Al alloy disk covered with NiP, wherein there are randomly oriented scratches in said NiP, said method further comprising the step of heating said substrate prior to said steps of depositing said layer comprising Cr and forming said magnetic layer.

13. Method of claim 1 wherein said crystalline layer comprises a B2 or a BCC crystal material in which the lattice parameter a is between 0.26 and 0.32 nm.

14. Method of claim 13 wherein said crystalline layer comprises a material selected from the list of materials consisting of (Cu, Co, Ni, Pd, Fe, Ru, Cr, V) Al, (Co, Cu, Ni, Pd, Fe, Ag, Au) Zn, and (Ag, Au) Mg.

15. Method of claim 1 wherein the thickness of said crystalline layer is greater than or equal to about 0.5 nm.

16. Method of claim 1 wherein the surface roughness Ra of said crystalline layer is less than 2 nm.

17. Method of claim 1 wherein the Ra of said crystalline layer is between 0.5 and 5 nm.

18. Method of claim 1 wherein said layer comprising Cr is between about 5 and 100 nm thick.

19. Method of claim 1 wherein said layer comprising Cr is an alloy comprising Cr and at least one material selected from the group consisting of V, Mo, Ta and Co.

20. Method of claim 1 wherein said crystalline layer increases the randomness of orientation of said layer comprising Cr.

21. Method of claim 1 wherein the surface of said crystalline layer is at a temperature exceeding about 200° C. prior to said step of depositing.

22. Method of claim 1 wherein said layer comprising Cr has a thickness greater than 5 nm.

23. Method of claim 1 wherein said substrate is textured.

24. Method of claim 1 wherein said crystalline layer has grains which grow with a random orientation.

25. A magnetic disk comprising:
a substrate;
a crystalline sublayer formed on said substrate;
an underlayer comprising Cr formed in an epitaxial relation with said sublayer, the crystallites within said underlayer having a substantially random orientation; and
a magnetically isotropic Co magnetic alloy layer formed in an epitaxial relation with said underlayer.

26. A method for manufacturing a magnetic disk comprising the steps of:
forming a crystalline layer on a substrate;
depositing a layer comprising Cr on said crystalline layer, the crystallites within said layer comprising Cr having a substantially random orientation; and
forming a magnetically isotropic Co based magnetic layer on said layer comprising Cr.

27. Method of claim 26 wherein said layer comprising Cr is formed in an epitaxial relation with said crystalline layer.

28. Method of claim 26 wherein said crystalline layer causes said layer comprising Cr to form without a preferred (200) orientation.

29. A magnetic disk comprising:
a substrate;
a crystalline sublayer formed on said substrate;
an underlayer comprising Cr formed on said sublayer, the crystallites within said underlayer having a substantially random orientation; and
a magnetically isotropic Co magnetic alloy layer formed on said underlayer.

30. A magnetic disk comprising:
a substrate;
a crystalline sublayer formed on said substrate;
an underlayer comprising Cr having randomly oriented grains;
a magnetically isotropic Co magnetic alloy layer formed in an epitaxial relation with said underlayer.

31. Magnetic disk of claim 30 wherein said crystalline sublayer causes said underlayer to have randomly oriented grains.

32. A magnetic disk comprising:
a substrate;
a crystalline sublayer formed on said substrate;
an underlayer comprising Cr, the crystallites within said underlayer comprising Cr having a substantially random orientation; and
a Co magnetic alloy having randomly oriented grains.

33. A disk drive comprising:
a magnetic disk as described in claim 29;
a rotor shaft, said magnetic disk mounted on said rotor shaft;
a motor for rotating said rotor shaft;
a read write head; and
an arm, said read-write head being mounted on said arm and held in proximity to said magnetic disk so that data can be read from and written to said magnetic disk by said read-write head.

34. Method of claim 26 wherein said magnetic layer is formed in an epitaxial relation with said layer comprising Cr.

35. A magnetic disk comprising:
a substrate;
a crystalline sublayer formed over said substrate;
an underlayer comprising Cr formed over said sublayer; and
a magnetic alloy film formed over said underlayer, said magnetic alloy being isotropic in the plane of said magnetic alloy film.

36. A magnetic disk comprising:
a substrate;
a crystalline sublayer formed over said substrate, the crystallites of said crystalline sublayer being randomly oriented;
an underlayer comprising Cr formed over said sublayer; and
a magnetic alloy film formed over said underlayer.

37. Magnetic disk of claim 36 wherein said magnetic alloy film is formed epitaxially on said underlayer.

38. A magnetic disk comprising:
a substrate;
a crystalline sublayer formed over said substrate;
a crystalline underlayer comprising Cr formed over said sublayer, the crystallites in said underlayer being randomly oriented; and
a magnetic alloy film formed over said underlayer.

39. Magnetic disk of claim 38 wherein said magnetic alloy film is formed epitaxially on said underlayer.

40. Magnetic disk of claim 38 wherein the crystallites of said sublayer are randomly oriented.

41. A magnetic disk comprising:
a substrate;
a crystalline sublayer formed over said substrate;
an underlayer comprising Cr formed over said sublayer; and
a magnetic alloy film formed over said underlayer, said magnetic alloy comprising crystallites that are randomly oriented in the plane of said magnetic alloy film.

42. A method for making a magnetic disk comprising:
forming a crystalline sublayer over said substrate;
forming a underlayer comprising Cr over said sublayer; and
forming a magnetic alloy film over said underlayer, said magnetic alloy being isotropic in the plane of said magnetic alloy film.

43. A magnetic disk comprising:
forming a crystalline sublayer formed over a substrate;
forming an underlayer comprising Cr over said sublayer; and
forming a magnetic alloy film over said underlayer, said magnetic alloy comprising crystallites that are randomly oriented in the plane of said magnetic alloy film.

44. A method for making a magnetic disk comprising:

forming a crystalline sublayer over said substrate, the crystallites in said sublayer having a random orientation;

forming an underlayer comprising Cr over said sublayer; and forming a magnetic alloy film over said underlayer.

45. Method of claim 44 wherein said magnetic alloy film is formed epitaxially on said underlayer.

46. A method for making a magnetic disk comprising:

forming a crystalline sublayer formed over a substrate;

forming an underlayer comprising Cr over said sublayer, the crystallites within said underlayer having a random orientation; and forming a magnetic alloy film over said underlayer.

47. Method of claim 46 wherein said magnetic alloy film is formed epitaxially on said underlayer.

48. Method of claim 46 wherein the crystallites in said sublayer have a random orientation.

49. A method for making a magnetic film comprising:

forming a crystalline layer on a substrate;

causing the surface of the structure formed by the preceding process step to have a temperature of at least 150° C;

forming an underlayer comprising Cr on said crystalline layer; and forming a magnetic layer on said underlayer.

* * * * *